(12) United States Patent
Tonouchi

(10) Patent No.: US 11,170,507 B2
(45) Date of Patent: Nov. 9, 2021

(54) IMAGE PROCESSING APPARATUS, METHOD AND PROGRAM

(71) Applicant: KABUSHIKI KAISHA TOSHIBA, Tokyo (JP)

(72) Inventor: Yojiro Tonouchi, Inagi Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 52 days.

(21) Appl. No.: 16/295,489

(22) Filed: Mar. 7, 2019

(65) Prior Publication Data

US 2020/0082533 A1    Mar. 12, 2020

(30) Foreign Application Priority Data

Sep. 12, 2018 (JP) .............................. JP2018-170622

(51) Int. Cl.
*G06T 7/11* (2017.01)
*G06T 7/187* (2017.01)
*G06K 9/18* (2006.01)

(52) U.S. Cl.
CPC .................. *G06T 7/11* (2017.01); *G06K 9/18* (2013.01); *G06T 7/187* (2017.01); *G06K 2209/01* (2013.01)

(58) Field of Classification Search
None
See application file for complete search history.

(56) References Cited

U.S. PATENT DOCUMENTS

| 2014/0093129 | A1* | 4/2014 | Okumura ................ G06T 7/248 382/103 |
| 2015/0371399 | A1  | 12/2015 | Tonouchi et al. |
| 2017/0104929 | A1  | 4/2017 | Ono |
| 2019/0034746 | A1* | 1/2019 | Feng ......................... G06T 7/70 |
| 2019/0197706 | A1* | 6/2019 | Trolat ..................... G06T 7/292 |
| 2019/0340789 | A1* | 11/2019 | Sugaya ..................... G06T 7/90 |

FOREIGN PATENT DOCUMENTS

| JP | 2008236712 A | * 10/2008 |
| JP | 2016-004553 A | 1/2016 |
| JP | 2016-012786 A | 1/2016 |

OTHER PUBLICATIONS

Hitachi, Ltd., "Automatic Meter Reading Service", 3 pages, Accessed on Feb. 16, 2018 from: http://www.hitachi.co.jp/products/infrastructure/product_site/retrofit/meterrd/index.html.

* cited by examiner

*Primary Examiner* — Jiangeng Sun
(74) *Attorney, Agent, or Firm* — Knobbe, Martens, Olson & Bear LLP

(57) ABSTRACT

According to one embodiment, an image processing apparatus includes a memory and a hardware processor in communication with the memory. The hardware processor is acquire an image obtained by photographing at least one detection target, detect the detection target from the image obtained, and instruct re-photographing of the detection target based on a result of the detection target.

14 Claims, 7 Drawing Sheets

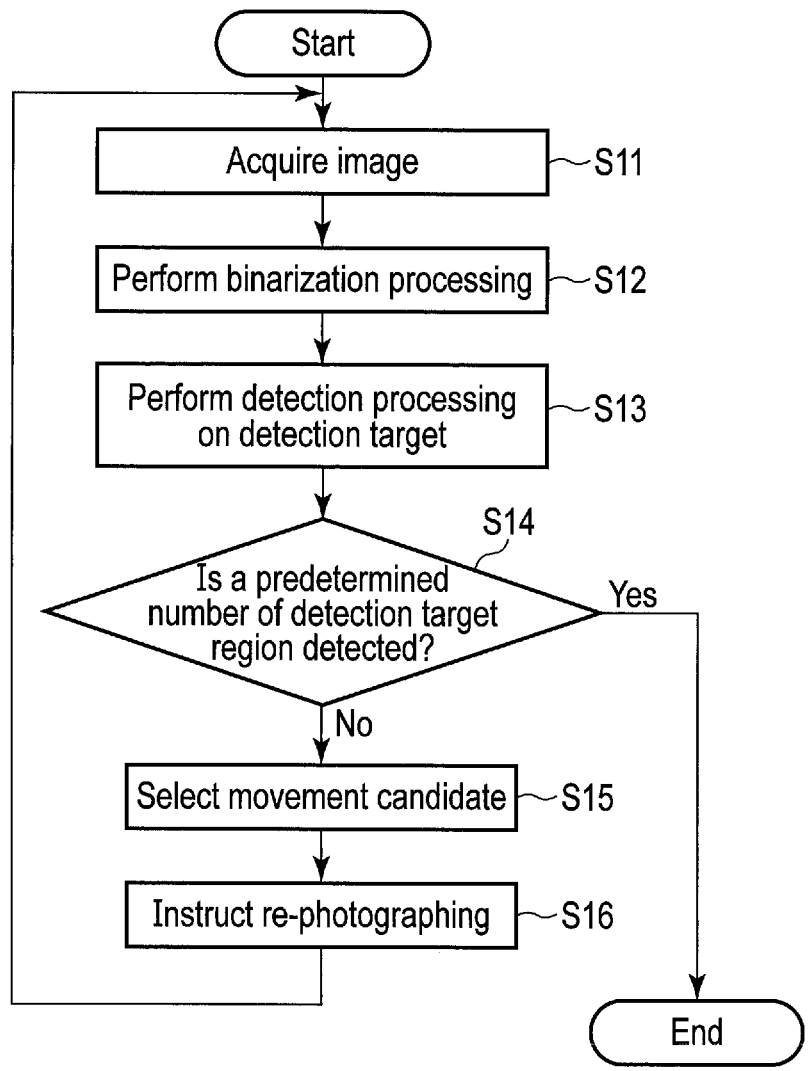
F I G. 3

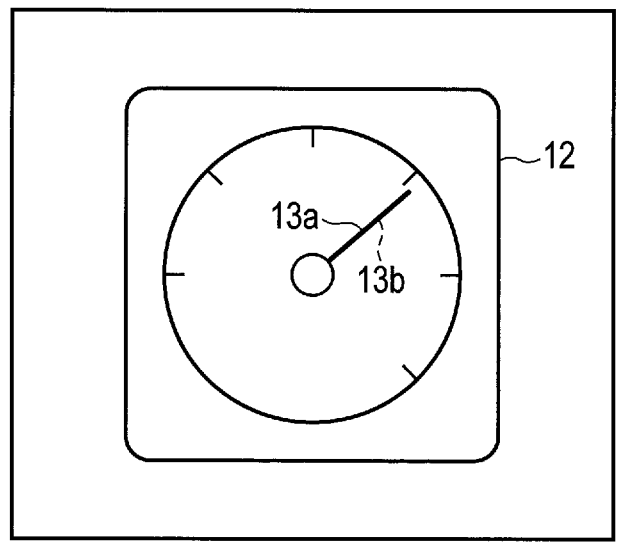
F I G. 4
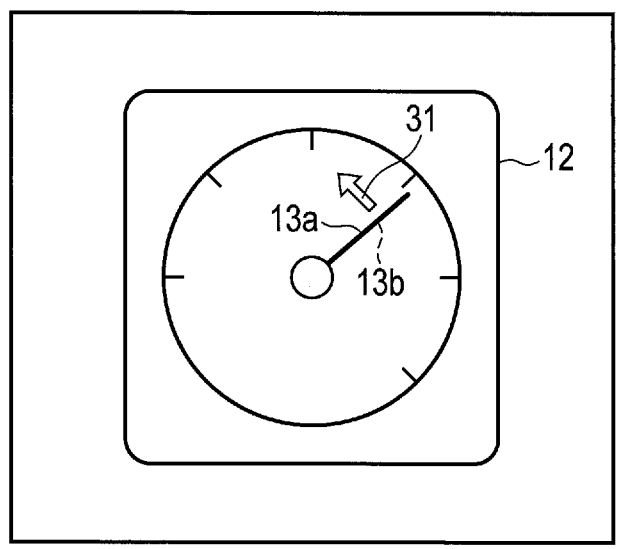
F I G. 5

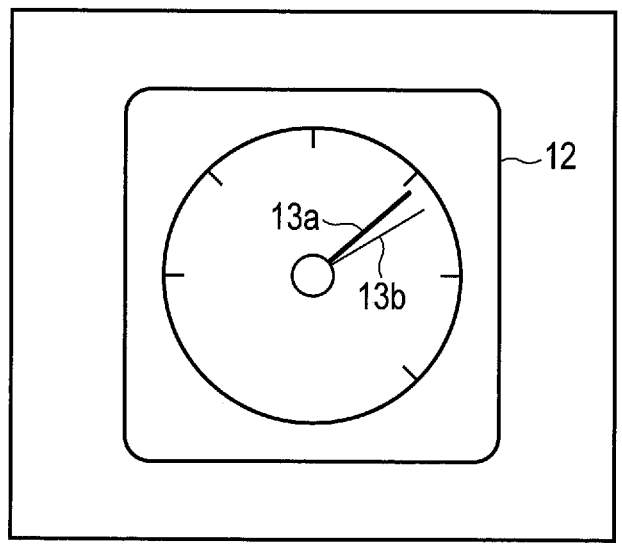
F I G. 6
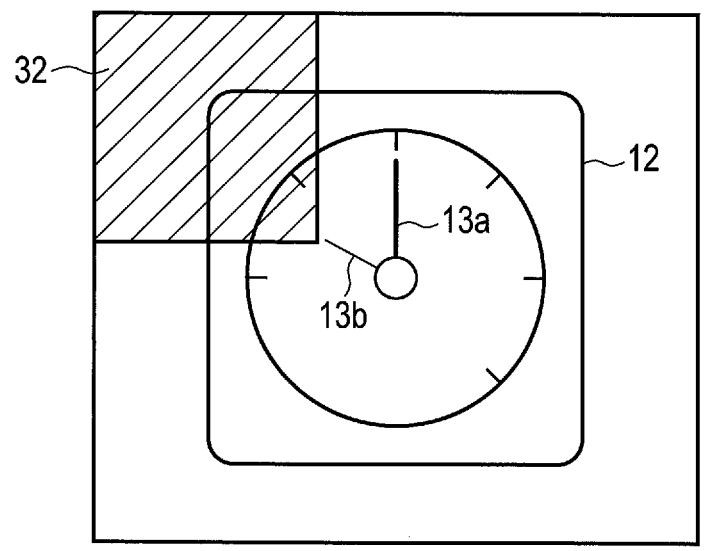
F I G. 7

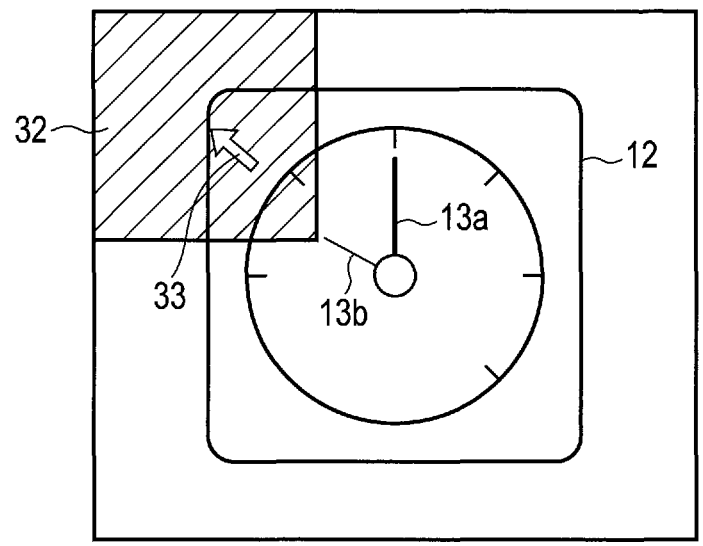
F I G. 8
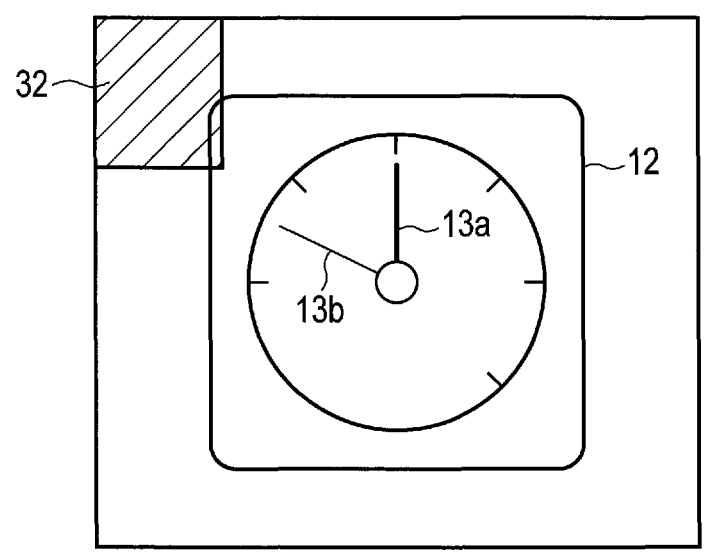
F I G. 9

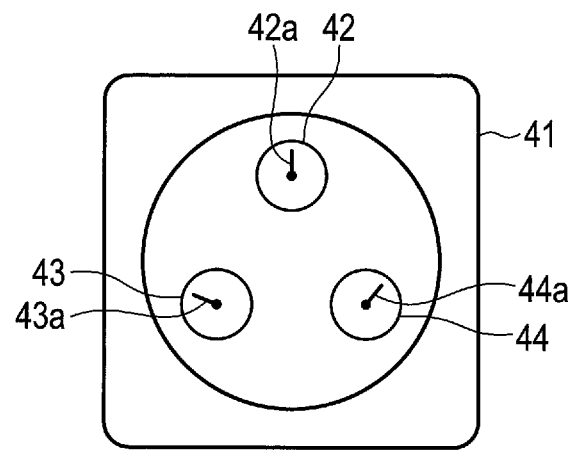
F I G. 10
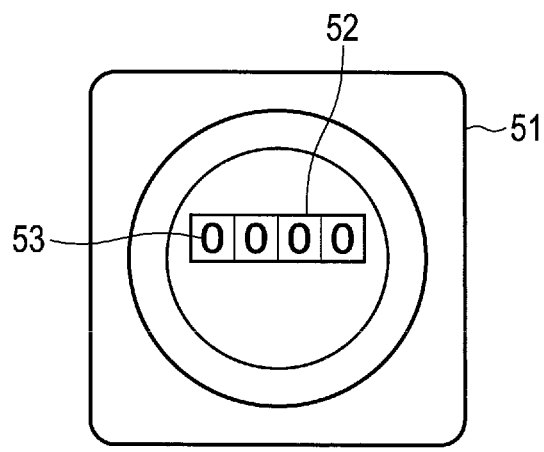
F I G. 11

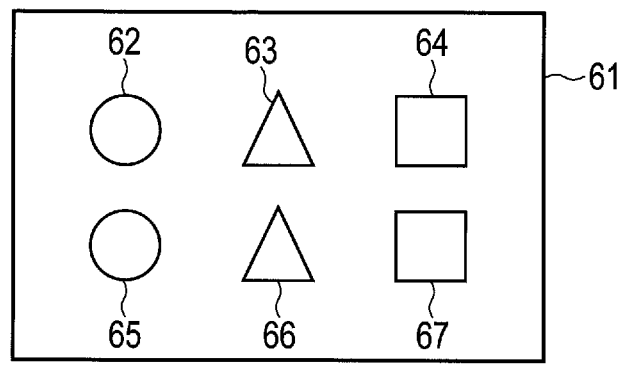
F I G. 12
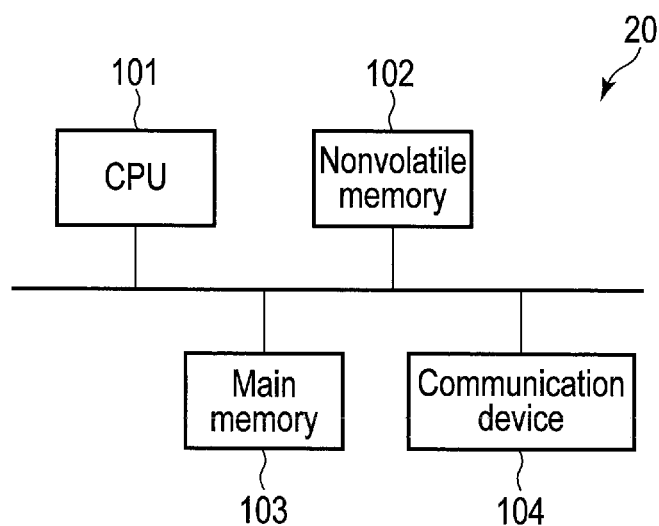
F I G. 13

IMAGE PROCESSING APPARATUS, METHOD AND PROGRAM

CROSS-REFERENCE TO RELATED APPLICATIONS

This application is based upon and claims the benefit of priority from Japanese Patent Application No. 2018-170622, filed Sep. 12, 2018, the entire contents of which are incorporated herein by reference.

FIELD

Embodiments described herein relate generally to an image processing apparatus, an method, and a program.

BACKGROUND

When a camera photographs a detection target, the detection target may not be detected correctly from the photographed image. For example, in the case of an analog meter having a plurality of pointers, when the photographing is performed in a state in which the pointers overlap each other, a part of the pointer may not be detected due to occlusion. In addition, a part or the whole of the pointer may not be detected due to halation such as light of a lighting apparatus.

BRIEF DESCRIPTION OF THE DRAWINGS

FIG. 3 is a flowchart showing an operation of the image processing apparatus according to the first embodiment;

FIG. 4 is a diagram showing an example of a photographed image according to the first embodiment;

FIG. 5 is a diagram showing an example of a case where a moving direction is indicated by an arrow icon according to the first embodiment;

FIG. 6 is a diagram showing an example of an image obtained by re-photographing according to the first embodiment;

FIG. 7 is a diagram showing an example of a photographed image according to a second embodiment;

FIG. 8 is a diagram showing an example of a case where a moving direction is indicated by an arrow icon according to the second embodiment;

FIG. 9 is a diagram showing an example of an image obtained by re-photographing according to the second embodiment;

FIG. 10 is a diagram showing a configuration of another analog meter according to the second embodiment;

FIG. 11 is a diagram showing an example of a digital meter according to a modified example;

FIG. 12 is a diagram showing an example of aggregate having a plurality of targets according to a modified example; and FIG. 13 is a diagram showing an example of a configuration of hardware of the image processing apparatus according to the first and second embodiments.

DETAILED DESCRIPTION

Hereinafter, embodiments will be described with reference to the drawings.

In general, according to one embodiment, an image processing apparatus includes a memory and a hardware processor in communication with the memory. The hardware processor is acquire an image obtained by photographing at least one detection target, detect the detection target from the image obtained, and instruct re-photographing of the detection target based on a result of the detection target.

First Embodiment

Figure 1:
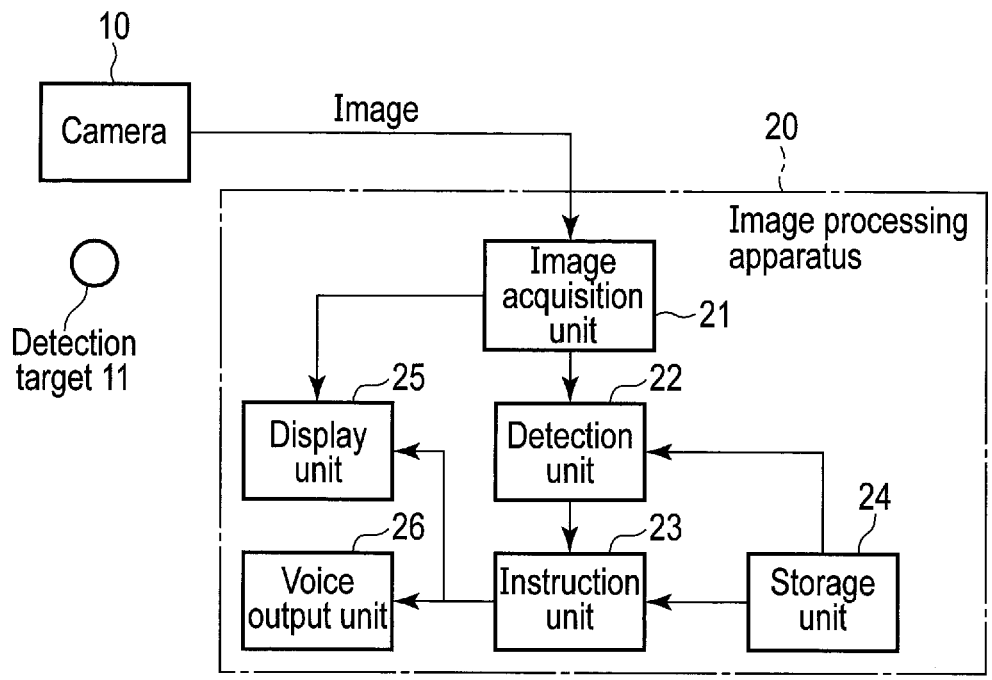
FIG. 1 is a block diagram showing a configuration of an image processing apparatus according to a first embodiment.

FIG. 1 is a block diagram showing a configuration of an image processing apparatus according to a first embodiment.

An image processing apparatus 20 has a function of detecting a detection target 11 from an image photographed by a camera 10 and instructing a direction of the camera 10 or the like based on the detection result. The camera 10 includes, for example, a monitoring camera installed at an arbitrary location, an electronic camera carried by a user, and the like. The detection target 11 includes all targets, which can be photographed by the camera 10, such as an analog meter having one or a plurality of pointers.

The image processing apparatus 20 includes an image acquisition unit 21, a detection unit 22, an instruction unit 23, a storage unit 24, a display unit 25, and a voice output unit 26 as components for realizing the above functions.

The image acquisition unit 21 acquires an image of the detection target 11 photographed by the camera 10. As the method of acquiring an image, for example, a method of acquiring an image via a recording medium, a communication medium or the like in addition to a method of directly acquiring an image from the camera 10 may be used.

The detection unit 22 performs processing for detecting the detection target 11 from the image acquired by the image acquisition unit 21 and outputs the detection result to the instruction unit 23. The detection result includes at least the number of detection targets 11 which can be detected from the photographed image. As the detection result, positional information (XY coordinates) on the image of the detection target 11 may be included.

The instruction unit 23 instructs a user to perform re-photographing of the detection target 11 based on the detection result of the detection unit 22. Specifically, the instruction unit 23 compares the number of detection targets 11 included in the detection result with the preset number of detection targets 11, and when the number of detection targets 11 and the preset number of detection targets 11 do not coincide with each other, the instruction unit 23 instructs a user to perform re-photographing of the detection target 11.

As the instruction method, the re-photographing method may be displayed on the display unit 25 as a text, or the direction of the re-photographing may be indicated by the arrow icon. In addition, it is also possible to instruct the re-photographing method by voice through the voice output unit 26.

The storage unit 24 stores setting information (kind, number, size, position, and the like of the detection target 11) related to the detection target 11.

The display unit 25 is a typical display device and displays the image acquired by the image acquisition unit 21. In addition, the display unit 25 is used to notify the user of the instruction related to the re-photographing by the text display, the icon display, or the like. The voice output unit 26 is a typical speaker and is used when notifying the user of the instruction related to the re-photographing by voice.

In the example of FIG. 1, a configuration which instructs the user to perform the re-photographing through the display unit 25 or the voice output unit 26 which are included in the image processing apparatus 20 is shown, but the configuration is not necessarily limited thereto. For example, the instruction unit may be wirelessly connected to a terminal device (not shown) carried by the user to instruct the user to perform the re-photographing. Examples of the terminal device include a personal computer (PC), a smart phone, a wearable terminal, and the like.

Hereinafter, the case where an analog meter is taken as an example and a plurality of pointers provided in the analog meter are detected as the detection target 11 from the photographed image will be described.

Figure 2:
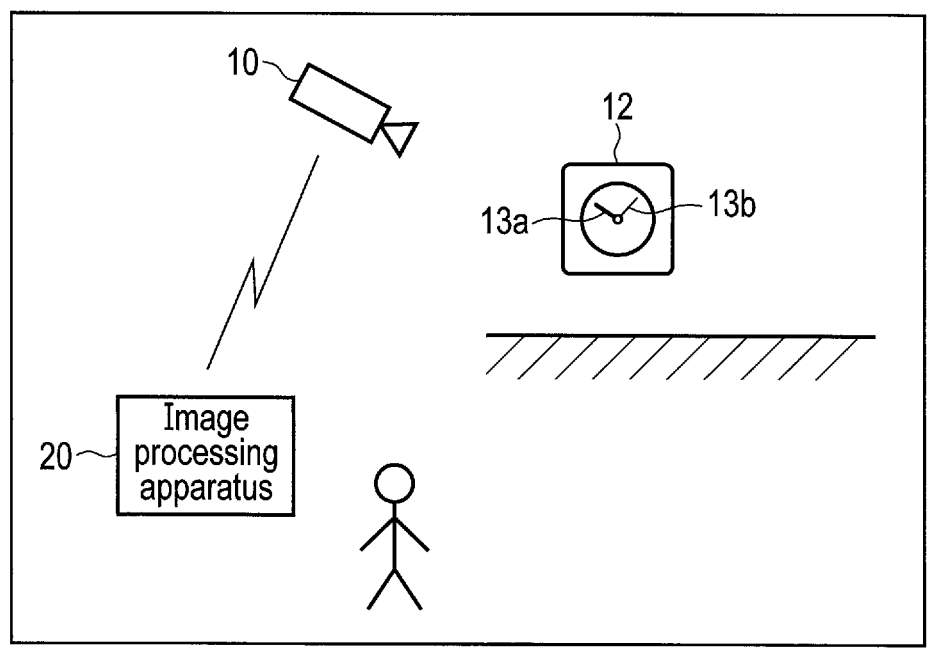
FIG. 2 is a diagram showing an example of a photographing location of a camera according to the first embodiment.

FIG. 2 is a diagram showing an example of a photographing location of the camera 10.

For example, an analog meter 12 for measuring some physical quantity is installed in a monitoring room of a building. The analog meter 12 has a plurality (two in this example) of pointers 13a and 13b. The camera 10 is installed near the analog meter 12, photographs the analog meter 12 by remote control by a remote controller or the like, and sends the photographed image to the image processing apparatus 20. The camera 10 and the image processing apparatus 20 may be connected to each other in a wireless or wired manner.

The user (supervisor) checks a measurement value of the analog meter 12 through the photographed image of the camera 10 displayed on the display unit 25 of the image processing apparatus 20. At that time, when the pointers 13a and 13b which are the detection targets 11 are not correctly photographed, the user is instructed to perform the re-photographing.

Hereinafter, the operation of the image processing apparatus 20 will be described in detail.

FIG. 3 is a flowchart showing the operation of the image processing apparatus 20. It should be noted that the processing shown in this flowchart is executed by allowing the image processing apparatus 20, which is a computer, to read a predetermined program. The same goes for processing shown in other flowcharts.

It is assumed that the analog meter 12 shown in FIG. 2 is photographed by the camera 10 and the photographed image is given to the image processing apparatus 20.

When acquiring the image photographed by the camera 10, the image acquisition unit 21 of the image processing apparatus 20 displays the image on the display unit 25 and provides the displayed image to the detection unit 22 (step S11).

FIG. 4 shows an example of the image of the analog meter 12 photographed by the camera 10.

In the example of FIG. 4, the pointers 13a and 13b of the analog meter 12 are photographed while overlapping each other, and a part or the entirety of the pointer 13b are in a hidden state. It is not necessary to display the image on the display unit 25 in real time at the time of the image acquisition and the image may be displayed when the instruction unit 23 to be described later instructs the re-photographing.

The detection unit 22 performs binarization processing on the image obtained by the image acquisition unit 21 (step S12). As the binarization processing, for example, the well-known "Otsu's binarization processing (discrimination analysis method)" is used to calculate a degree of separation from the image, and the image is binarized into black and white by using a threshold at which the degree of separation is maximum. In addition to the pointers 13a and 13b, shafts of the pointers and scales, numbers, and the like on a dial plate are extracted as regions of black pixels by the binarization processing.

The detection unit 22 extracts a region in which black pixels are continuous as a connected component. The detection unit 22 extracts a region having an elongated shape from a plurality of connected components as a region (detection target region) where the detection target 11 is present (step S13) by the following procedure.

(1) Calculate a covariance matrix of two-dimensional coordinates of pixels constituting the connected component in the photographed image.

(2) Calculate eigenvalues of the covariance matrix to determine the connected component having a ratio of a first eigenvalue and a second eigenvalue, which is equal to or larger than a predetermined threshold, as the detection target region. When there are multiple detection target regions, a connected component is extracted in order starting from the connected component having the largest ratio of the first eigenvalue to the second eigenvalue.

When a predetermined number of detection target regions can be extracted from the photographed image (Yes in step S14), the instruction unit 23 ends the processing.

Meanwhile, when a predetermined number of detection target regions cannot be extracted from the photographed image, that is, if the two pointers 13a and 13b set as the detection targets 11 in the storage unit 24 cannot be correctly detected (No in step S14), the instruction unit 23 selects a movement candidate from the photographed image (step S15). The instruction unit 23 instructs the user to perform the re-photographing so as to move the position of the movement candidate (step S19).

Describing in detail, when a predetermined number of detection targets 11 cannot be detected, the possibility of occlusion is high. That is, there is a high possibility that the two pointers 13a and 13b, which are the detection targets 11, are photographed while overlapping each other. The detection target region extracted near the center of the image is selected as a movement candidate. This is because there is a high possibility that the occlusion occurs due to the overlapping of the plurality of detection targets 11 at the center of the image.

The instruction unit 23 determines a direction in which the movement candidate is moved and instructs the user by the display or voice. It should be noted that the moving direction may be indicated by both display and voice.

FIG. 5 shows an example of a case where the moving direction is indicated by an arrow icon.

The detection target region corresponding to the pointer 13a on the photographed image is selected as the movement candidate, and an arrow icon 31 is added to the movement candidate. The arrow icon 31 indicates a direction in which the position of the movement candidate is moved.

Here, the direction in which the movement candidate is moved is determined as follows, for example.

Determine the moving direction based on the shape of the detection target 11. For example, if the detection target 11 has an elongated shape, a direction vertical to a longitudinal direction of the detection target region selected as the movement candidate is set as the moving direction. In this case, if the moving direction is the vertical direction, the detection target 11 may be on the right side or the left side of the detection target region.

Determine the moving direction based on a dispersion state of black pixels obtained by performing the binarization processing on the image. In this case, if the movement candidate is moved in a direction in which the dispersion of the black pixels is small, there is a high possibility that another hidden detection target 11 appears due to the occlusion.

Determine the moving direction based on the position of the detection target 11 on the image. For example, if the detection target 11 is near the center of the image, the direction away from the center of the image is set as the moving direction. As described above, this is because there is a high possibility that the occlusion generally occurs at the center of the image.

The movement candidate may be highlighted on the image. If there are a plurality of movement candidates, each movement candidate is displayed by the arrow icon 31 or highlighted. The user determines which of the movement candidates is to be moved.

At this time, for example, the re-photographing may be instructed by voice, such as "Please change the direction of the camera to perform the re-photographing".

In addition, the arrow icon 31 is displayed on the photographed image, and the re-photographing may be instructed by the display and the voice, for example, "Please change the direction of the camera to perform the re-photographing so as to move the pointer of the meter in the direction indicated by the icon". The same goes for the case where the movement candidate is highlighted, and the re-photographing may be instructed by the display and the voice.

FIG. 6 shows an example of the image obtained by the re-photographing.

The direction of the camera 10 is changed in accordance with the instruction of the re-photographing by the arrow icon 31 to photograph the analog meter 12, so that the pointer 13b hidden under the pointer 13a can be checked on the photographed image.

When a predetermined number of detection targets 11 are not detected even after the re-photographing, the re-photographing is repeatedly instructed. However, when a predetermined number of detection targets 11 cannot be detected even though the re-photographing is repeated several times, there is a possibility that the direction of the camera 10 is not the cause. For example, there is some trouble in the photographing function of the camera 10, and therefore a normal photographed image may not be obtained.

Therefore, when the maximum number of times N of the re-photographing is determined and a predetermined number of detection targets 11 are not detected even if it reaches the maximum number of times N, a warning may be issued without instructing the re-photographing. As the warning method, the display or voice is performed in the same manner as the instruction of re-photographing. Alternatively, a warning may be issued by both the display and the voice.

As described above, according to the first embodiment, in the case where the detection target cannot be correctly detected from the photographed image due to, for example, the occlusion, the re-photographing is instructed in the direction to eliminate the occlusion. Therefore, the user can correctly recognize the detection target on the photographed image by changing the direction of the camera according to the instruction to perform the re-photographing.

Second Embodiment

Next, a second embodiment will be described.

In the first embodiment, the case where the detection target 11 cannot be correctly detected due to occlusion has been described. In the second embodiment, a case where a detection target 11 cannot be correctly detected due to halation due to illumination reflection or the like will be described.

A configuration and a processing operation of an image processing apparatus 20 are the same as those in the first embodiment. Hereinafter, the operation of the second embodiment will be described using specific examples of FIGS. 7 and 9.

FIG. 7 is a diagram showing an example of an image of an analog meter 12 photographed by a camera 10. Two pointers 13a and 13b provided in the analog meter 12 are set as the detection target 11 in advance.

Similar to the first embodiment, when the image processing apparatus 20 acquires a photographed image of the camera 10, the image processing apparatus 20 performs binarization processing on the photographed image, and extracts a region (detection target region) in which the detection target 11 is present based on connected components of black pixels obtained by the binarization processing. When a predetermined number of detection target regions cannot be detected, the image processing apparatus 20 selects a movement candidate from the photographed image and instructs a user to perform re-photographing so as to move a position of a movement candidate (see FIG. 3).

Here, in the second embodiment, an instruction unit 23 of the image processing apparatus 20 has a function of detecting a halation region from the photographed image and selecting the halation region as the movement candidate.

The halation region can be obtained by detecting a region having a brightness threshold greater than a predetermined brightness threshold in the photographed image. In the example of FIG. 7, reference numeral 32 in FIG. 7 is a halation region, and is on a part of the pointer 13b which is one of the detection targets 11.

In this way, if the detection target 11 cannot be correctly detected due to the halation, the re-photographing is instructed to remove the halation from the detection target 11. Specifically, as shown in FIG. 8, the instruction unit 23 selects the halation region 32 as the movement candidate, and attaches an arrow icon 33 to the selected halation region 32 to instruct the movement candidate to be moved in an arrow direction.

In this case, assuming that a part or the whole of the detection target 11 is hidden under the halation region 32, a direction away from the detection target 11 is determined as the moving direction based on the position of the detection target 11 (pointer 13b in an example of FIG. 8) on an image. When the plurality of halation regions 32 are present, the halation regions 32 near the detection target 11 are selected as selection candidates.

FIG. 9 shows an example of the image obtained by the re-photographing.

The direction of the camera 10 is changed in accordance with the instruction of the re-photographing by the arrow icon 33 to photograph the analog meter 12, so that the pointer 13b hidden under the halation region 32 can be checked on the photographed image.

At this time, for example, the re-photographing may be instructed by voice, such as "Please change the direction of the camera to perform the re-photographing".

In addition, the arrow icon 33 is displayed on the photographed image, and the re-photographing may be instructed by the display and the voice, for example, "Please change the direction of the camera to perform the re-photographing so as to move the halation region in the direction indicated by the icon".

When a predetermined number of detection targets 11 are not detected even after the re-photographing, the re-photographing is repeatedly instructed. At this time, when the maximum number of times N of the re-photographing is determined and a predetermined number of detection targets 11 are not detected even if the number of times reaches the maximum number of times N, a warning may be issued without instructing the re-photographing.

Meanwhile, when the halation region is not detected from the photographed image, that is, if halation is not the cause, as described in the first embodiment, the movement candidate is selected in consideration of the occlusion, and the re-photographing is instructed to move the position of the movement candidate.

As described above, according to the second embodiment, in the case where the detection target cannot be correctly detected from the photographed image due to, for example, the halation, the re-photographing is instructed in the direction to eliminate the halation. Therefore, the user can correctly recognize the detection target on the photographed image by changing the direction of the camera according to the instruction to perform the re-photographing.

In the first and second embodiments described above, events (occlusion/halation) which cannot detect the detection target 11 are assumed and the re-photographing is instructed in the direction in which the event is removed, but any configuration may be used regardless of the events as long as the re-photographing is promoted when the detection target 11 cannot be detected from the photographed image. In this case, the user determines in which direction the camera 10 is directed, but it can be understood in which direction the camera 10 is to be directed by monitoring the photographed image by the display unit 25 or the like.

In addition, as the configuration of the analog meter 12, an analog meter having two pointers is described as an example, an analog meter having one pointer may be used or an analog meter having three or more pointers may be used. If the kind, number, the position, the size, and the like of the pointers are set, it is possible to receive the instruction of the re-photographing when the detection target 11 cannot be detected from the photographed image in the same manner as described above.

Further, as shown in FIG. 10, for example, an analog meter 41 in which a plurality of (in this example, three) dial plates 42, 43, and 44 are independently provided is photographed by the camera 10, and pointers 42a, 43a, and 44a of each of the dial plates 42, 43, 44 can be detected as the detection target 11 from the photographed image.

Modified Example

A detection target 11 is not limited to objects such as measuring instruments, and may be characters (including numbers).

FIG. 11 shows an example of a digital meter 51. The digital meter 51 is provided with a display 52, and digit strings 53 of several digits (four digits in this example) are digitally displayed on the display 52. If the number, positions, and the like of digit strings 53 displayed on the display 52 are set, when a predetermined number of numbers cannot be detected from the photographed image, re-photographing is instructed.

In addition, a character string written on a sheet having a predetermined form such as a slip may be set as the detection target 11, and a sheet thereof may be photographed by the camera 10.

As a method of detecting a character string from an image, for example, a method of using a connected component in which black pixels are connected in an image and a method of using a machine learning based detector may be used. In addition, there is also the method disclosed in Japanese Patent No. 6352695 and the like.

Further, for example, as shown in FIG. 12, it can also be used to photograph some aggregate 61 and detect individual objects 62 to 67 as the detection target 11 from the photographed image. The image of the aggregate 61 is, for example, a group photograph, and the objects 62 to 67 become persons. If the number of objects 62 to 67 is set in advance, if a predetermined number of detection targets 11 (persons) cannot be detected from the photographed image, the re-photographing is instructed. By changing the direction of the camera 10 according to the instruction of the re-photographing to perform photographing, it is possible to easily obtain the good photographed image.

(Hardware Configuration)

FIG. 13 is a diagram showing an example of a hardware configuration of the image processing apparatus 20 according to the first and second embodiments.

The image processing apparatus 20 includes a CPU 101, a nonvolatile memory 102, a main memory 103, a communication device 104, and the like.

The CPU 101 is a hardware processor which controls an operation of various components in the image processing apparatus 20. The CPU 101 executes various programs loaded from the nonvolatile memory 102 which is a storage device into the main memory 103.

The program executed by the CPU 101 includes not only an operating system (OS) but also a program (hereinafter referred to as an image processing program) for executing the processing operation shown in the flowchart of FIG. 3. In addition, the CPU 101 also executes, for example, a basic input/output system (BIOS) which is a program for hardware control.

Some or all of the image acquisition unit 21, the detection unit 22, the instruction unit 23, and the storage unit 24 shown in FIG. 1 are realized by causing the CPU 101 (computer) to execute a recognition processing program.

This recognition processing program may be stored in a computer readable recording medium and distributed, or may be downloaded to the image processing apparatus 20 through a network. Some or all of the image acquisition unit 21, the detection unit 22, the instruction unit 23, and the storage unit 24 may be realized by hardware such as an integrated circuit (IC), or as a combination of the software and the hardware.

The communication device 104 is a device configured to perform communication with an external device in a wired or wireless manner, for example.

In the example of FIG. 13, only the CPU 101, the nonvolatile memory 102, the main memory 103, and the communication device 104 are shown, but the image processing apparatus 20 may include other storage devices such as hard disk drive (HDD) and solid state drive (SSD). Further, the image processing apparatus 20 may include an input device, a display device, a voice output device, and the like.

According to at least one embodiment described above, it is possible to provide an image processing apparatus, an method, and a program for correctly detecting a user desired detection target from a photographed image.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
a memory configured to store setting information including a first number of detection targets; and
a hardware processor in communication with the memory, the hardware processor configured to:
acquire an image obtained by photographing at least one detection target;
detect a second number of detection targets from the image;
determine that the second number of detection targets differs from the first number of detection targets; and
in response to determining that the second number of detection targets differs from the first number of detection targets, output an instruction to instruct a user to re-photograph the at least one detection target.

2. The image processing apparatus according to claim 1, wherein the hardware processor is further configured to select a region, in which the detection target in the image is hidden, as a movement candidate, and instructs the user to re-photograph to move a position of the movement candidate.

3. The image processing apparatus according to claim 2, wherein the hardware processor is further configured to notify the user a direction in which the position of the movement candidate is moved.

4. The image processing apparatus according to claim 3, wherein the hardware processor is further configured to determine the direction in which the position of the movement candidate is moved based on a shape of the detection target.

5. The image processing apparatus according to claim 3, wherein the hardware processor is further configured to determine the direction in which the position of the movement candidate is moved based on a dispersion state of black pixels obtained by performing binarization processing on the image.

6. The image processing apparatus according to claim 3, wherein the hardware processor is further configured to determine the direction in which the position of the movement candidate is moved based on the position of the detection target in the image.

7. The image processing apparatus according to claim 1, wherein the hardware processor is further configured to detect a halation region in the image, selects the halation region as a movement candidate, and instructs the user to re-photograph to move a position of the movement candidate.

8. The image processing apparatus according to claim 7, wherein the hardware processor is further configured to notify the user a direction in which the position of the movement candidate is moved.

9. The image processing apparatus according to claim 8, wherein the hardware processor is further configured to determine the direction in which the position of the movement candidate is moved based on the position of the detection target.

10. The image processing apparatus according to claim 1, wherein the hardware processor is further configured to issue a warning when the second number does not match the first number after a number of re-photographing reaches a maximum number of times for re-photographing.

11. An image processing method comprising:
storing setting information including a first number of detection targets;
acquiring an image obtained by photographing at least one detection target;
detecting a second number of detection targets from the image;
determining that the second number of detection targets differs from the first number of detection targets; and
in response to determining that the second number of detection targets differs from the first number of detection targets, outputting an instruction to instructing a user to re-photograph the at least one detection target.

12. A non-transitory computer-readable storage medium storing instructions executed by a computer and setting information including a first number of detection targets, wherein the instructions, when executed by the computer, cause the computer to perform:
acquiring an image obtained by photographing at least one detection target;
detecting a second number of detection targets from the image;
determining that the second number of detection targets differs from the first number of detection targets; and
in response to determining that the second number of detection targets differs from the first number of detection targets, outputting an instruction to instructing a user to re-photograph the at least one detection target.

13. The image processing apparatus according to claim 1, wherein the hardware processor is configured to output the instruction through a display.

14. The image processing apparatus according to claim 1, wherein the hardware processor is configured to output the instruction through a speaker.

* * * * *